US008842979B2

(12) United States Patent
Jung

(10) Patent No.: US 8,842,979 B2
(45) Date of Patent: Sep. 23, 2014

(54) MULTIMEDIA REPRODUCTION DEVICE AND DISC PLAYER

(75) Inventor: Young-sun Jung, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/287,222

(22) Filed: Nov. 2, 2011

(65) Prior Publication Data

US 2013/0107426 A1    May 2, 2013

(30) Foreign Application Priority Data

Nov. 2, 2010    (KR) .................. 10-2010-0108412

(51) Int. Cl.
*H04N 5/76*     (2006.01)
*G11B 27/10*    (2006.01)
*H04N 21/4363*  (2011.01)
*H04N 21/426*   (2011.01)

(52) U.S. Cl.
CPC ........ *G11B 27/105* (2013.01); *H04N 21/43635* (2013.01); *G11B 2220/2537* (2013.01); *H04N 21/42646* (2013.01)
USPC .......................................... 386/361; 386/362

(58) Field of Classification Search
None
See application file for complete search history.

(56) References Cited

U.S. PATENT DOCUMENTS

| | | | |
|---|---|---|---|
| 5,349,575 A | 9/1994 | Park | |
| 2005/0022214 A1* | 1/2005 | Ho | ................... 720/600 |
| 2007/0139558 A1* | 6/2007 | Reineke | .................. 348/571 |
| 2009/0121665 A1* | 5/2009 | Kuwamura | ............. 318/400.13 |
| 2011/0107359 A1* | 5/2011 | Lee et al. | ................... 720/600 |
| 2012/0140102 A1* | 6/2012 | Park et al. | ............... 348/333.02 |

FOREIGN PATENT DOCUMENTS

| | | |
|---|---|---|
| JP | 2005-251317 | 9/2005 |
| KR | 10-0141056 B1 | 3/1998 |
| KR | 10-2004-0034664 | 4/2004 |
| KR | 20-0360651 | 9/2004 |
| KR | 10-0693434 | 3/2007 |
| KR | 10-2009-0109021 | 10/2009 |

OTHER PUBLICATIONS

Korean Office Action issued Oct. 18, 2012 in counterpart Korean Patent Application No. 10-2010-0108412 (4 pages, in Korean).

* cited by examiner

*Primary Examiner* — William C Vaughn, Jr.
*Assistant Examiner* — Eileen Adams
(74) *Attorney, Agent, or Firm* — NSIP Law

(57) ABSTRACT

A multimedia reproduction device including: a drive module that is configured to drive a storage medium and that includes a front-end part that processes data read from the storage medium, a back-end module including an audio unit and a video unit that is configured to reproduce audio/video (AV) signals output from the drive module; and a housing that is configured to accommodate the drive module and the back-end module.

20 Claims, 5 Drawing Sheets

MULTIMEDIA REPRODUCTION DEVICE AND DISC PLAYER

CROSS-REFERENCE TO RELATED PATENT APPLICATION

This application claims the benefit of Korean Patent Application No. 10-2010-0108412, filed on Nov. 2, 2010, in the Korean Intellectual Property Office, the entire disclosure of which is incorporated herein by reference for all purposes.

BACKGROUND

1. Field

The following description relates to a multimedia reproduction device and a disc player.

2. Description of the Related Art

Audio/video (AV) players are multimedia reproduction devices that include a disc driving mechanism and an analog AV generation unit configured to generate an AV output signal reproduced from a disc. The disc driving mechanism is used only for general multimedia reproduction devices.

A 9.5 mm slim or half/height (H/H) optical disc drive for use in a laptop or desktop computer includes a so-called front-end part. Processing of a back-end part, i.e., AV signals, is performed using a digital processor built in the laptop or desktop computer. Thus, such optical disc drives can be used based on a computer's characteristics and capabilities.

SUMMARY

In one general aspect there is provided a multimedia reproduction device. The multimedia reproduction device includes a drive module configured to drive a storage medium, and that comprises a front-end part that processes data read from the storage medium; a back-end module comprising an audio unit and a video unit that is configured to reproduce audio/video (AV) signals output from the drive module, and a housing that is configured to accommodate the drive module and the back-end module.

The multimedia reproduction device may include a multimedia output unit comprising an AV output unit that is configured to output AV signals from the back-end module.

The multimedia reproduction device may include a back-end module that further includes an interface that is configured to output AV signals to an external device.

The multimedia reproduction device may include an interface that includes at least one of a high-definition multimedia interface (HDMI) and a universal serial bus (USB).

The multimedia reproduction device may include an interface that includes an Ethernet unit that enables the downloading of stream content from the Internet.

The multimedia reproduction device may include a multimedia output unit that is one selected from a television (TV), a personal computer (PC), and a wired/wireless mobile device.

The multimedia reproduction device may include a drive module that is built in the multimedia output unit.

The multimedia reproduction device may include a drive module that is built in the multimedia output unit.

The multimedia reproduction device may include a drive module that has a tray or slot-in structure that is configured to transfer a storage medium.

The multimedia reproduction device may include a drive module that has a tray or slot-in structure that is configured to transfer a storage medium.

The multimedia reproduction device may include a drive module that is configured to perform at least one of reading from the storage medium, and writing to the storage medium.

The multimedia reproduction device may include a drive module that is configured to perform at least one of reading from the storage medium, and writing to the storage medium.

The multimedia reproduction device may be configured to be installed into an electronic device.

In another aspect, there is provided a disc player. The disc player includes a drive module that is configured to drive a storage medium, and that comprises a front-end part that processes data output from the storage medium, a back-end module comprising an audio unit and a video unit that is configured to reproduce audio/video (AV) signals which are output from the drive module; and a housing that is configured to accommodate the drive module and the back-end module.

The disc player may include a drive module that has a structure that satisfies SFF-8552 specification.

The disc player may include an AV output unit that is configured to output AV signals from the back-end module.

The disc player may include an interface that is configured to output AV signals to an external device.

The disc player may be configured to be installed into an electronic device.

In another aspect, there is provided a disc player having a drive module that is configured to drive a storage medium and that includes a front-end part that processes data read from the storage medium, and a housing that is configured to accommodate the drive module. The disc player includes an improvement that includes a back-end module that is installed within the housing, wherein the backend module comprises an audio unit and a video unit is configured to reproduce audio/video (AV) signals output from the drive module.

The disc player may be configured to be installed into an electronic device.

Other features and aspects may be apparent from the following detailed description, the drawings, and the claims.

Figure 1:
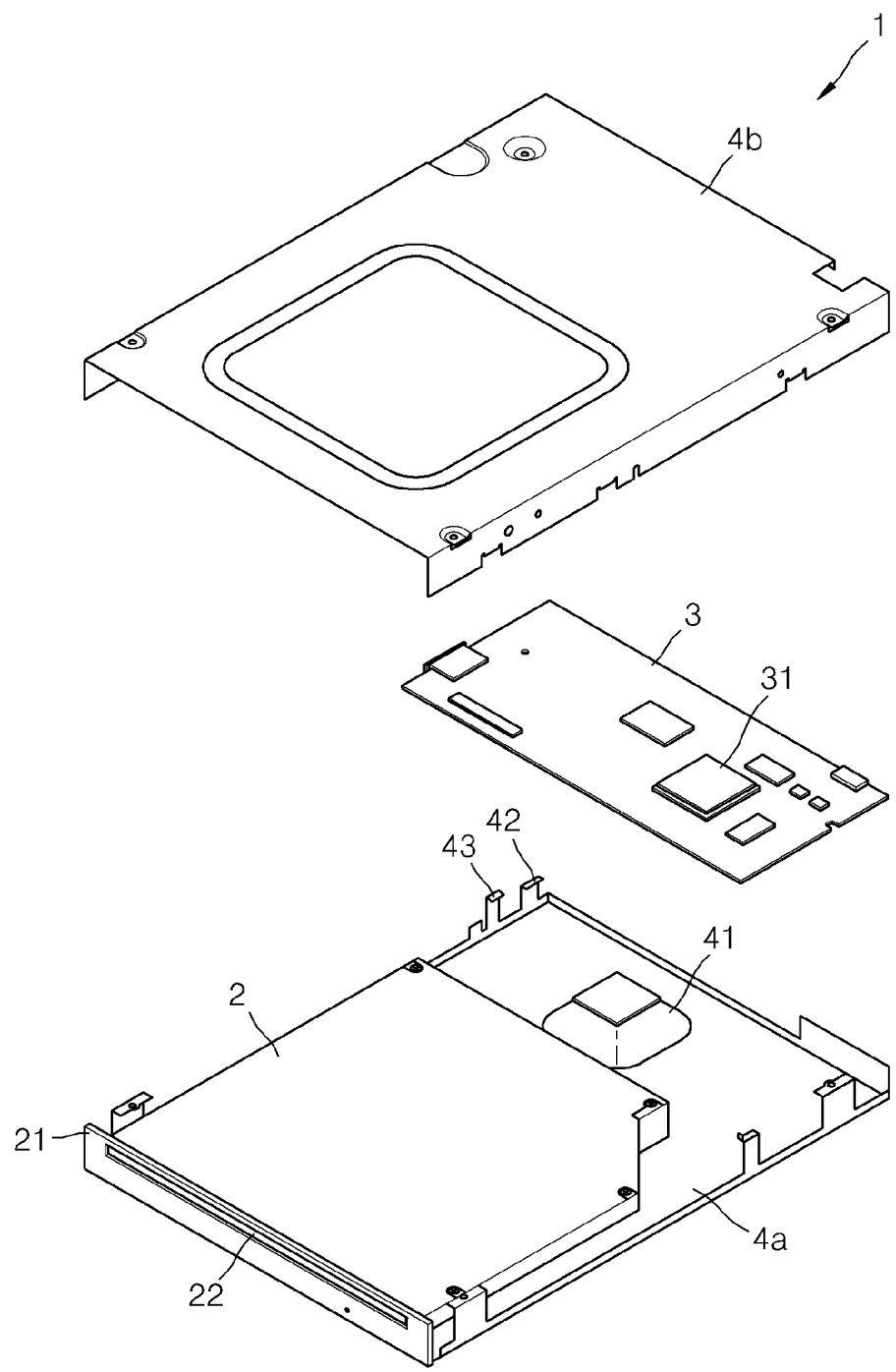
FIG. 1 is a drawing illustrating an example of a multimedia reproduction device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
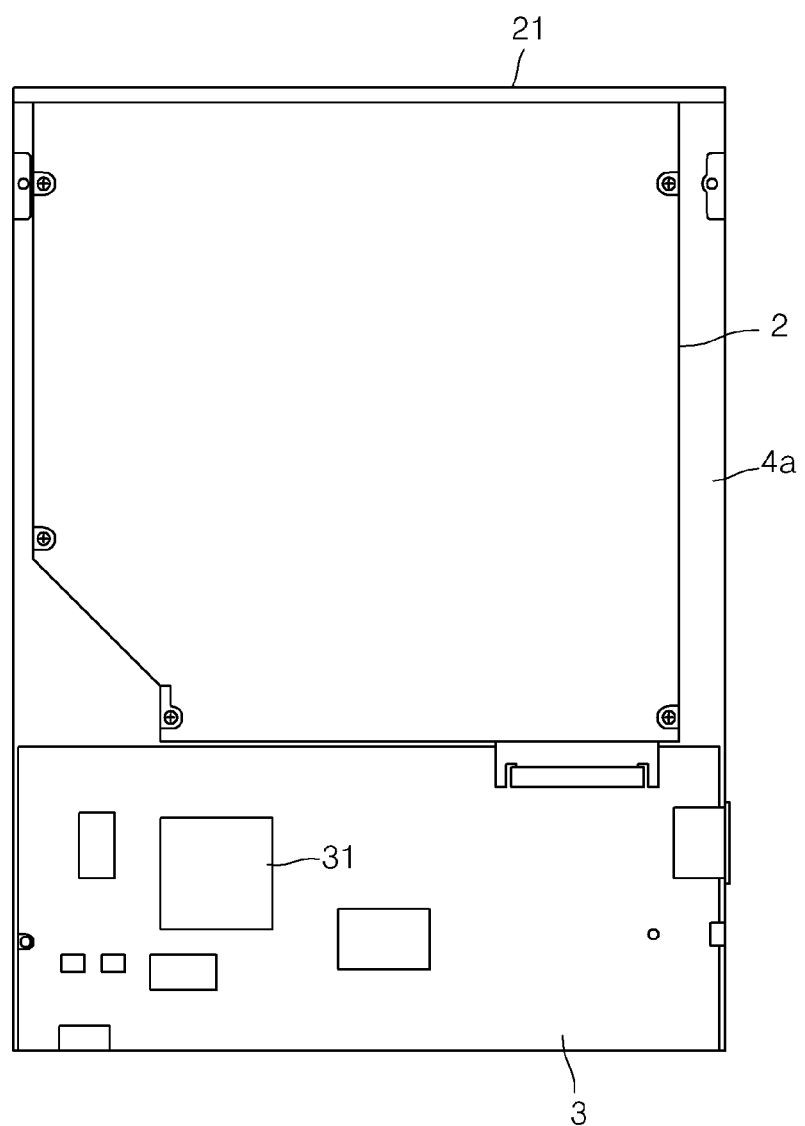
FIG. 2 is a drawing illustrating an example of an internal structure of the multimedia reproduction device.

FIG. 1 is a drawing illustrating an example of a multimedia reproduction device 1. For example, the multimedia reproduction device 1 may be a disc player, such as an optical disc player or the like. FIG. 2 is a drawing illustrating an example of an internal structure of a multimedia reproduction device.

Referring to FIGS. 1 and 2, the multimedia reproduction device 1 includes a drive module 2, a back-end module 3, and a housing. For example, the housing may include two portions 4a and 4b. The drive module 2 may be, for example, an optical drive module or the like.

The drive module 2 includes a panel 21 disposed in front of the drive module 2 and having a slot 22 in which a storage medium (e.g., a disc) is to be inserted. As an example, the drive module 2 may be an optical drive module. The panel 21 may be designed for a standardized laptop computer. The panel 21 includes a pickup, a servo part that is configured to control the pickup, and a digital signal processor (DSP) for processing signals output from the pickup. For example, the panel 21 may be a disc drive incorporated into a laptop computer. The disc drive may be an optical disc drive (ODD). This will be described below.

The back-end module 3 may include a System on Chip (SoC) 31. The SoC 31 may include an audio unit and a video unit that process signals output from the optical drive module 2 and an output interface that outputs signals. For example, the output interface may output AV signals. This will be described below.

The housing 4 accommodates the drive module 2 and the back-end module 3. The housing 4 may include a lower panel 4a and an upper panel 4b that together define a cavity within which the drive module 2 and back-end module 3 are disposed. The lower panel 4a has a projected cooling structure 41 that contacts a bottom surface of the back-end module 3 so as to dissipate heat generated in the SoC 31. The upper panel 4b protects the drive module 2 and the back-end module 3 disposed on the lower panel 4a.

The multimedia reproduction device having the above structure illustrated in FIG. 1 may include a multimedia output unit including an amplifier for outputting an audio signal and a display unit for displaying an image. For example, the multimedia output unit may be a television (TV), a personal computer (PC), or a wired/wireless mobile device, such as a personal multimedia player (PMP).

As a non-limiting example, the drive module 2 may have a structure that satisfies the SFF-8552 specification. In particular, the drive module may have a slim structure.

Figure 3:
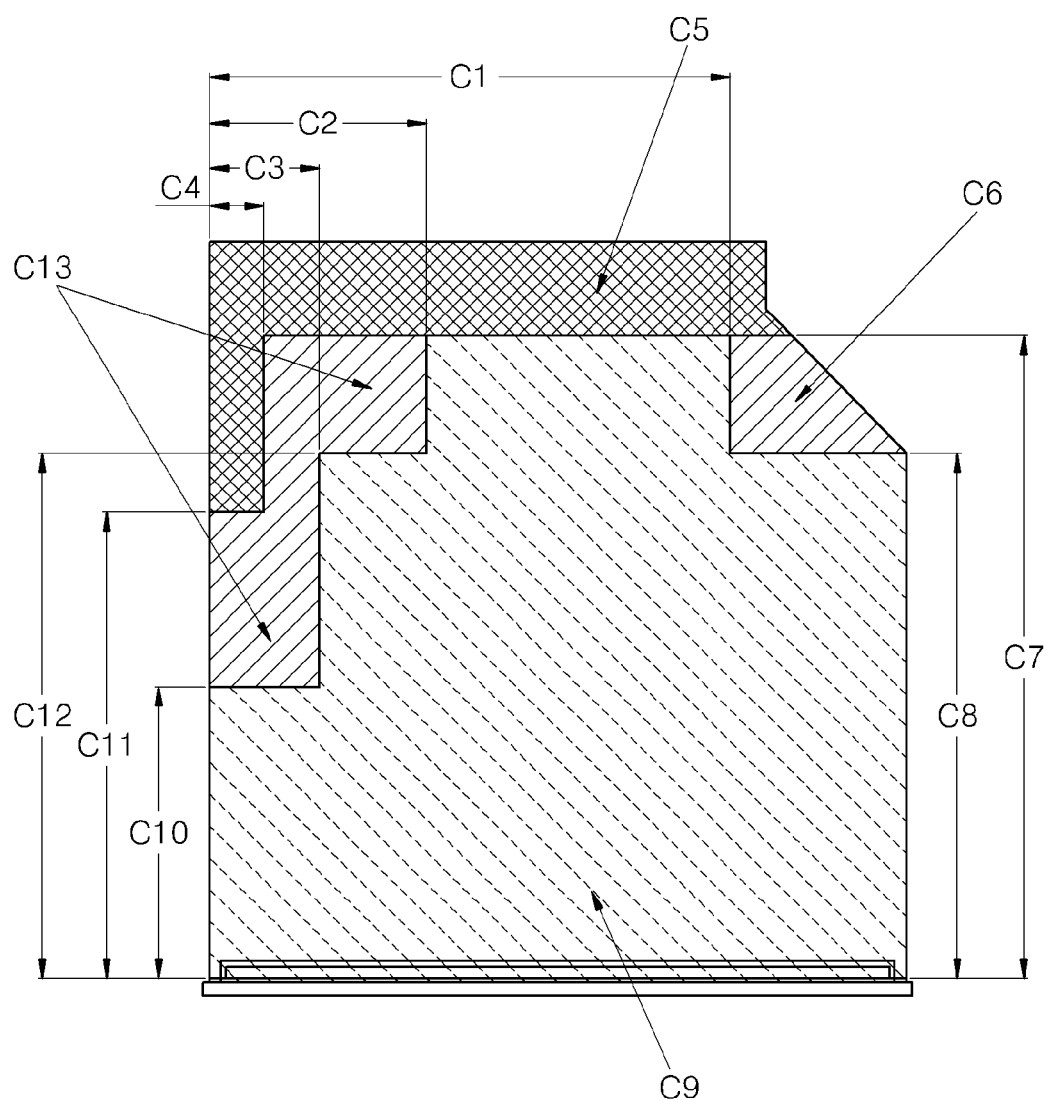
FIG. 3 is a drawing illustrating an example of the specification of an optical disc drive (ODD) for a laptop computer defined in SFF.

FIG. 3 illustrates part of a design diagram of a 9.5 mm slim ODD defined in SFF-8552. The following Table 1 shows the total dimensions including factors illustrated in FIG. 3. The detailed content thereof may be found at SFF-8552 Rev 1.4 RC (ftp://ftp.seagate.com/sff). The SFF-8552 Specification Rev. 1.4 RC is incorporated herein in its entirety.

TABLE 1

| Designator | Dimension (mm) | Tolerance (mm) | Designator | Dimension (mm) | Tolerance (mm) |
|---|---|---|---|---|---|
| A1 | 97.40 | ±.20 | A27 | 110.10 | ±.20 |
| A2 | 65.10 | ±.20 | A28 | 2X M2 | Depth 1.5 Min |
| A3 | 52.60 | ±.20 | A29 | 2X 6.80 | ±.20 |
| A4 | 21.25 | ±.30 | A30 | 3.60 | ±.30 |
| A5 | 3.80 | ±.20 | A31 | | |
| A6 | 6.00 | ±.30 | A32 | 3.00 | Max |
| A7 | 6.15 | ±.30 | A33 | 10.50 | Max |

TABLE 1-continued

| Designator | Dimension (mm) | Tolerance (mm) | Designator | Dimension (mm) | Tolerance (mm) |
|---|---|---|---|---|---|
| A8 | 4X M2 | Depth 1.5 Min | A34 | 90.0 | ±.20 |
| A9 | 3X 3.20 | ±.20 | A35 | 90.0 degrees | ±3.0 degrees |
| A10 | 128.00 | ±.20 | A36 | XXX | ±.30 |
| A11 | 102.60 | ±.20 | B1 | 0.90 | |
| A12 | 9.50 | +.50/−.20 | B2 | 12.00 | |
| A13 | 3X 2.30 | ±.20 | B3 | 0.00 | |
| A14 | 3X M2 | Depth 1.5 Min | C1 | 96.20 | |
| A15 | 89.85 | ±.85 | C2 | 40.00 | |
| A16 | 114.65 | ±.75 | C3 | 20.00 | |
| A17 | 110.10 | ±.20 | C4 | 10.00 | |
| A18 | 27.30 | ±.20 | C5 | Less than 1 | Newtons |
| A19 | 5.30 | ±.20 | C6 | Less than 0.5 | Newtons |
| A20 | 4.60 | ±.20 | C7 | 110.00 | |
| A21 | XXX | ±.30 | C8 | 90.00 | |
| A22 | 126.00 | Max | C9 | 0.00 | Newtons |
| A23 | 2.00 | Min | C10 | 50.00 | |
| A24 | XXX | ±.30 | C11 | 80.00 | |
| A25 | 126.10 | ±.20 | C12 | 90.00 | |
| A26 | 27.30 | ±.20 | C13 | Less than 0.5 | Newtons |

Appearances and dimensions described above are strictly designated so that the laptop computer may use ODDs manufactured by various companies other than a manufacturer of the 9.5 mm slim ODD.

However, such ODDs for use only for a laptop computer cannot be applied to other devices. For example, in an aspect, there is provided a multimedia reproduction device that is manufactured with reduced manufacturing costs while maintaining a small size thereof when an ODD for a smart TV that has been recently widespread is manufactured. As an example, an ODD for a laptop computer is mounted as the drive module 2 for the multimedia reproduction device 1. For example, an ODD for a laptop computer defined in SFF-8552, may be mounted as the drive module 2 for the multimedia reproduction device 1. Thus, when the multimedia reproduction device 1 is designed, the cost associated with designing an additional optical drive module may be reduced. As an example, one drive module may be used in both the laptop computer and the multimedia reproduction device 1. Thus, a manufacturer's cost burden may be reduced.

Figure 4:
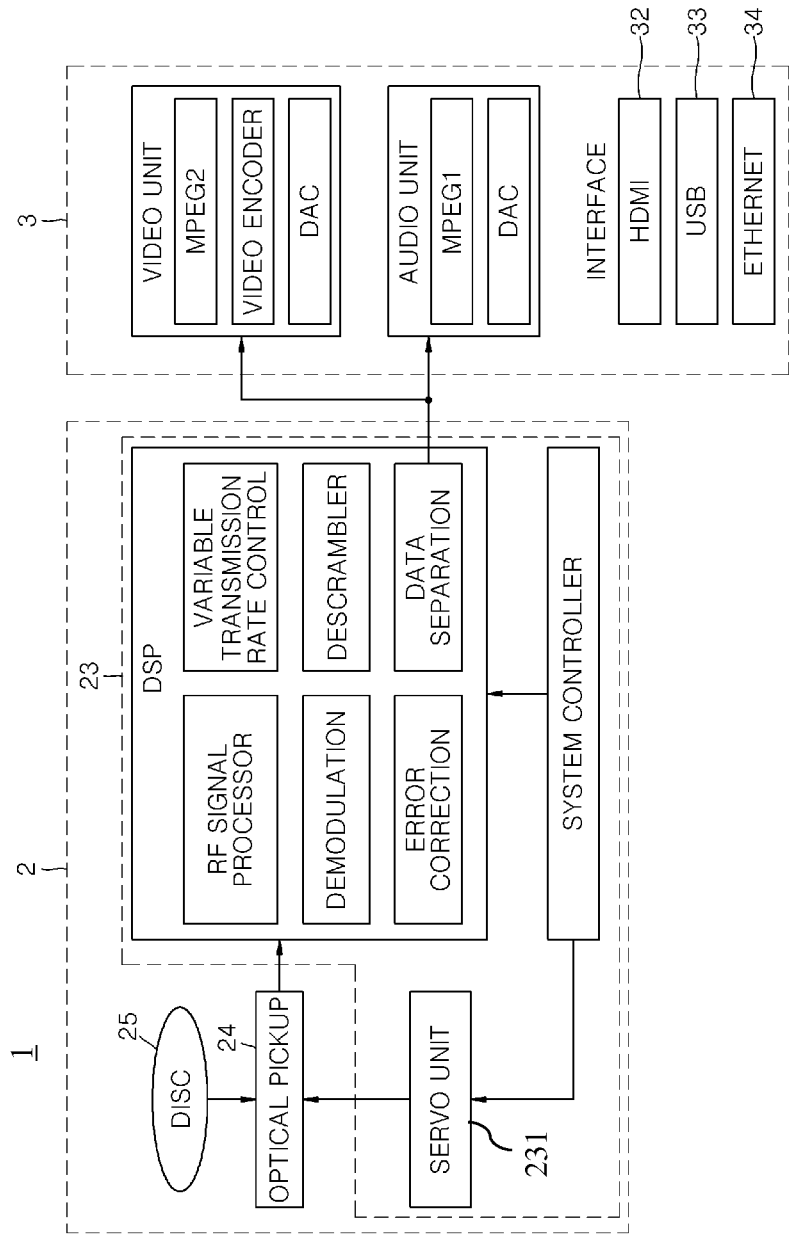
FIG. 4 is a drawing illustrating an example of a multimedia reproduction device.

FIG. 4 is a drawing illustrating an example of a multimedia reproduction device.

Referring to FIG. 4, a drive module 2 includes an pickup 24 for reading/writing information from/on a storage medium 25 (e.g., a disc) and a front-end part 23. The front-end part 23 includes a servo unit 231 that is configured to control the pickup 24, a radio frequency (RF) signal processor for processing signals output from the optical pickup 24, a demodulation unit, an error correction unit, a variable transmission rate controller, a descrambler, and a data separator.

The back-end module 3 processes an audio signal and a video signal output from the front-end part 23 separately by using an MPEG decoder, converts the processed audio signal and video signal by using a digital analog converter (DAC), and outputs the converted audio and video signals.

The output interface configured to output signals (e.g., AV signals) may be a high-definition multimedia interface (HDMI) 32. In addition, the back-end module 3 may include an Ethernet unit 34 configured to enable the downloading of stream content from the Internet. The back-end module 3 may further include a universal serial bus (USB) 33 that is an interface unit configured to control the drive module 2.

The drive module 2 may reproduce a CD, DVD, and/or a Blu-ray disc (BD). For example, the drive may a Blu-ray disc (BD) that has been spotlighted to have a very high storage capacity as well as a compact disc/digital versatile disc (CD/DVD).

The drive module 2 may have a so-called slot-in structure that is configured to transfer the storage medium 25 (e.g., disc). Alternatively, the drive module 2 may have general tray that is configured to transfer the storage medium 25 (e.g., disc).

Figure 5:
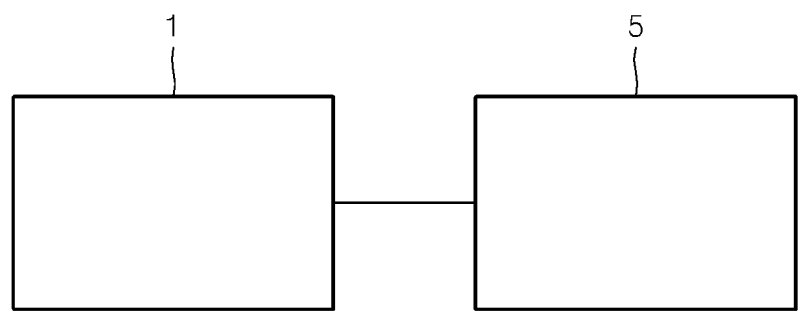
FIGS. 5 and 6 illustrate examples of a structure of a multimedia reproduction device.

As illustrated in FIG. 5, the multimedia reproduction device 1 may be connected to an external multimedia device 5 as an independent single device. As an example, the multimedia reproduction device 1 may be connected to the external multimedia device 5 by an AV cable. For example, the multimedia reproduction device 1 may be contained within a housing that is distinct from the housing of the external multimedia device 5. As an example, an external multimedia output unit may be a TV, a PC, or a wired/wireless mobile device.

Figure 6:
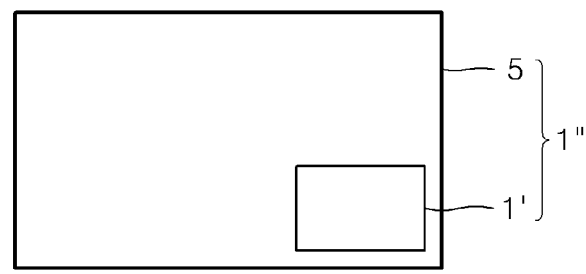

As illustrated in FIG. 6, a multimedia device 5 may accommodate a housing, a drive module, and a back-end module. For example, a multimedia device 5 may have integrated or incorporated therein, an AV player 1'. The multimedia device 5 may be an electronic device such as a TV, a computer, portable game console. And the AV player 1' may be a multimedia reproduction device or disc player such as an optical disc player. Thus, in other words, the AV player 1' may be installed or integrated into the multimedia device 5. As an example, a multimedia reproduction device 1" having the above structure illustrated in FIG. 6 includes a TV 5 as the multimedia device and an AV player 1' built in the TV 5. A housing of the AV player 1' or the multimedia reproduction device 1" may be part of an external multimedia output unit and may be built in the external multimedia output unit.

As an example, a drive module may reproduce information from the storage medium (e.g., disc) and may further write information on the storage medium (e.g., disc).

As described above, if a multimedia reproduction device or an optical disc player having an independent structure is manufactured, a separately-designed drive module (or disc drive (ODD)) is not used. An ODD for a standardized laptop computer may be used without any modification. Thus, a multimedia reproduction device may use all ODDs that satisfy predetermined specifications regardless of the manufacturer of such ODDs. This structure provides economical advantages to a user as well as the manufacturer. For example, the user may replace a faulty or broken ODD with a new ODD.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia reproduction device comprising:
an optical drive module configured to drive an optical storage medium, and that comprises a front-end part that processes data read from the storage medium;
a back-end module comprising an audio unit and a video unit that is configured to reproduce audio/video (AV) signals output from the optical drive module; and
a housing comprising a total space that is configured to accommodate the optical drive module and the back-end module,
wherein the back-end module is configured to process the AV signals output from the front-end part using a decoder, convert the processed AV signals using a digital analog converter, and output the converted AV signals; and
the optical drive module of the multimedia reproduction device has a structure that occupies at least half of the total space of the housing configured to accommodate the optical drive module and the back-end module of the multimedia reproduction device.

2. The multimedia reproduction device of claim 1, further comprising a multimedia output unit comprising an AV output unit that is configured to output AV signals from the back-end module.

3. The multimedia reproduction device of claim 1, wherein the back-end module further comprises an interface that is configured to output AV signals to an external device.

4. The multimedia reproduction device of claim 3, wherein the interface comprises at least one of a high-definition multimedia interface (HDMI) and a universal serial bus (USB).

5. The multimedia reproduction device of claim 3, wherein the interface comprises an Ethernet unit that enables the downloading of stream content from the Internet.

6. The multimedia reproduction device of claim 2, wherein the multimedia output unit is one selected from a television (TV), a personal computer (PC), and a wired/wireless mobile device.

7. The multimedia reproduction device of claim 2, wherein the optical drive module is built in the multimedia output unit.

8. The multimedia reproduction device of claim 6, wherein the optical drive module is built in the multimedia output unit.

9. The multimedia reproduction device of claim 7, wherein the optical drive module has a tray or slot-in structure that is configured to transfer a storage medium.

10. The multimedia reproduction device of claim 8, wherein the optical drive module has a tray or slot-in structure that is configured to transfer a storage medium.

11. The multimedia reproduction device of claim 1, wherein the optical drive module is configured to perform at least one of reading from the storage medium, and writing to the storage medium.

12. The multimedia reproduction device of claim 7, wherein the optical drive module is configured to perform at least one of reading from the storage medium, and writing to the storage medium.

13. The multimedia reproduction device of claim 1, wherein the multimedia reproduction device is configured to be installed into an electronic device.

14. A disc player comprising:
- an optical drive module that is configured to drive an optical storage medium, and that comprises a front-end part that processes data output from the storage medium;
- a back-end module comprising an audio unit and a video unit that is configured to reproduce audio/video (AV) signals which are output from the optical drive module; and
- a housing comprising a total space that is configured to accommodate the optical drive module and the back-end module,
- wherein the back-end module is configured to process the AV signals output from the front-end part using a decoder, convert the processed AV signals using a digital analog converter, and output the converted AV signals; and
- the optical drive module of the disc player has a structure that occupies at least half of the total space of the housing configured to accommodate the optical drive module and the back-end module of the disc player.

15. The disc player of claim 14, wherein the optical drive module has a structure that satisfies SFF-8552 specification.

16. The disc player of claim 14, further comprising an AV output unit that is configured to output AV signals from the back-end module.

17. The disc player of claim 14, further comprising an interface that is configured to output AV signals to an external device.

18. The disc player of claim 14, wherein the disc player is configured to be installed into an electronic device.

19. A disc player having an optical drive module that is configured to drive an optical storage medium and that includes a front-end part that processes data read from the storage medium, and a housing comprising a total space that is configured to accommodate the optical drive module, wherein the improvement comprises:
- a back-end module that is installed within the total space of the housing,
- wherein the backend module comprises an audio unit and a video unit is configured to reproduce audio/video (AV) signals output from the optical drive module;
- the back-end module is configured to process the AV signals output from the front-end part using a decoder, convert the processed AV signals using a digital analog converter, and output the converted AV signals; and
- the optical drive module of the disc player has a structure that occupies at least half of the total space of the housing configured to accommodate the optical drive module and the back-end module of the disc player.

20. The disc player of claim 19, wherein the disc player is configured to be installed into an electronic device.

* * * * *